United States Patent [19]

Pillsbury

[11] Patent Number: 5,261,226
[45] Date of Patent: Nov. 16, 1993

[54] TOPPING COMBUSTOR FOR AN INDIRECT FIRED GAS TURBINE

[75] Inventor: Paul W. Pillsbury, Winter Springs, Fla.

[73] Assignee: Westinghouse Electric Corp., Pittsburgh, Pa.

[21] Appl. No.: 749,376

[22] Filed: Aug. 23, 1991

[51] Int. Cl.⁵ .............................................. F02C 3/20
[52] U.S. Cl. ............................... 60/39.463; 60/39.511
[58] Field of Search ............ 60/760, 737, 726, 39.463, 60/39.511

[56] References Cited

U.S. PATENT DOCUMENTS

| | | | |
|---|---|---|---|
| 3,773,462 | 11/1973 | Waeselynck | 263/19 A |
| 4,257,235 | 3/1981 | Morishita et al. | 60/737 |
| 4,339,925 | 7/1982 | Eggmann et al. | 60/760 |
| 4,369,624 | 1/1983 | Hamm et al. | 60/39 |
| 4,408,461 | 10/1983 | Bruhwiler | 60/737 |
| 4,967,561 | 11/1990 | Brühwiler et al. | 60/737 |

FOREIGN PATENT DOCUMENTS

| | | |
|---|---|---|
| 3833832 | 12/1990 | Denmark . |
| 0061262 | 9/1982 | European Pat. Off. . |
| 0204553 | 10/1986 | European Pat. Off. . |
| 2330865 | 3/1977 | France . |
| 2358553 | 10/1978 | France . |
| 250739 | 7/1948 | Switzerland . |
| A292514 | 8/1929 | United Kingdom . |
| 1106755 | 3/1968 | United Kingdom . |

OTHER PUBLICATIONS

"The Coal-Fired Air Furnace Combined Cycle, Thermodynamic Analysis of an Externally-Fired Gas Turbine Electric Generating Plant," Pittsburgh Energy Technology Center, U.S. Department of Energy (Jul. 1990).

Andrews et al., "Mixing and Fuel Atomisation Effects on Premixed Combustion Performance" A.S.M.E. Paper 83-GT-55 (1983).

U.S. Abdul Hussain et al., "Low NOx Primary Zones Using Jet Mixing Shear Layer Combustion" A.S.M.E. Paper 88-GT-308 (1988).

Robertson et al., "Second-Generation Pressurized Fluidized Bed Combustion Plant, Conceptual Design and Optimization of a Second-Generation PFB Combustion Plant," pp. 134-159 (Sep. 1989).

Primary Examiner—Richard A. Bertsch
Assistant Examiner—W. J. Wicker

[57] ABSTRACT

A topping combustor is provided for a gas turbine power plant in which the combustion air from the compressor section of the gas turbine is heated in an indirect heat exchanger disposed in a solid fuel fired furnace. The compressed air from the compressor section flows through an annular passage enclosing the combustor inner shell on its way to the furnace, thereby cooling the inner shell. A burner comprised of a fuel distributor plate assembly having a plurality of fuel nozzles mounted therein is disposed in the inner vessel. Further compressed and cooled air from the compressor section flows through the plate assembly and mixes with a conventional fuel supplied to the fuel nozzles. A plurality of holes are formed in the plate assembly which distribute the combustion air around the nozzles. The high combustion air temperature and low gas velocity downstream of the plate assembly allow stable combustion to occur at ultra-lean fuel/air ratios, thereby minimizing the formation of $NO_x$.

5 Claims, 4 Drawing Sheets

5,261,226

TOPPING COMBUSTOR FOR AN INDIRECT FIRED GAS TURBINE

FIELD OF THE INVENTION

The current invention concerns a gas turbine combustor. More specifically, the current invention concerns a topping combustor for a gas turbine fired primarily by indirect heating in a furnace burning a solid fuel.

BACKGROUND OF THE INVENTION

The high efficiency, low capital cost and short lead time of gas turbine based systems make them particularly attractive to electric utilities as a means for producing electrical power. However, traditionally, gas turbine operation has been limited to expensive, sometimes scarce, fuels—chiefly distillate oil and natural gas. As a result of the ready availability and low cost of coal, considerable effort has been expended toward developing a gas turbine system for generating electrical power which can utilize coal as its primary fuel.

Unfortunately, burning coal directly in the hot gas which is to flow through the turbine section of the gas turbine presents a variety of problems, such as erosion of the turbine blades due to particulate matter entrained in the gas and corrosion due to various contaminates in the coal. Consequently, interest has focused on indirect heating of the gas to be expanded in the turbine section by flowing the compressed air discharging from the compression section of the gas turbine through a heat exchanger disposed in a coal fired furnace, such as a fluidized bed combustor. However, such heat exchangers are incapable of heating the air entering the turbine to the temperatures required for high efficiency in modern turbines.

Consequently, it has been proposed to employ a topping combustor burning a conventional gas turbine fuel (i e., natural gas or no. 2 distillate oil) to further heat the gas from the heat exchanger. Such a scheme is shown in U.S. Pat. No. 4,369,624, (Hamm et al.), assigned to the same assignee as the current invention and hereby incorporated by reference.

Unfortunately, conventional gas turbine combustors are not suitable for use as topping combustors for several reasons. First, they rely on combustion air for cooling. In conventional gas turbines this presents no problem since the combustion air is the compressed air discharged by the compressor section. The temperatures of such air is typically only 370° C. (700° F.) and, hence, is suitable for cooling purposes. However, topping combustors use air from the coal furnace heat exchanger as combustion air and the temperature of such air must be relatively high to obtain high efficiency, typically 980° C. (1800° F.). As a result, a conventional gas turbine combustor would be insufficiently cooled to achieve adequate durability when used as a topping combustor. Second, the high temperature of the combustion air supplied to the topping combustor promotes the formation of nitrogen oxides (NO$_x$), a harmful air pollutant. Hence, the amount of NO$_x$ produced by a conventional gas turbine combustor supplied with such high temperature combustion air would be objectionable.

Consequently, it would be desirable to provide a topping combustor for an indirect fired gas turbine which employs hot compressed air from a heat exchanger as combustion air yet which achieves adequate cooling for good durability and which minimizes the formation of NO$_x$.

SUMMARY OF THE INVENTION

It is an object of the current invention to provide a topping combustor for an indirect fired gas turbine.

It is a further object of the current invention that such topping combustor be adapted to receive hot air from a solid fuel furnace heat exchanger as its combustion air yet be cooled by compressed air from the compressor section.

It is yet another object of the invention that such topping combustor minimize the formation of NO$_x$.

These and other objects are accomplished in a gas turbine power plant having (i) a gas turbine having a compressor section for providing compressed air and a turbine section for receiving a hot gas, (ii) a furnace having an indirect heat exchanger and adapted to heat at least a portion of the compressed air from the compressor section in the indirect heat exchanger by burning a solid fuel, thereby producing hot compressed air, and (iii) a combustor adapted to heat the hot compressed air produced by the furnace by burning a fuel therein, thereby producing the hot gas received by the turbine section. The combustor has (i) inner and outer conduits forming an annular passage therebetween which is in flow communication with the compressor section, the inner conduit contains a reaction zone for burning the fuel and for directing the flow of the hot air produced by the furnace, (ii) means for blocking a substantial portion of the flow area of the inner conduit, whereby the velocity of the flow in the reaction zone is non-uniform, the blocking means having an air passage formed therein, (iii) means for directing cooling air to the air passage, and (iv) a fuel nozzle for introducing a fuel/air mixture into the reaction zone, the fuel nozzle having means for receiving air from the air passage.

DESCRIPTION OF THE PREFERRED EMBODIMENT

Figure 1:
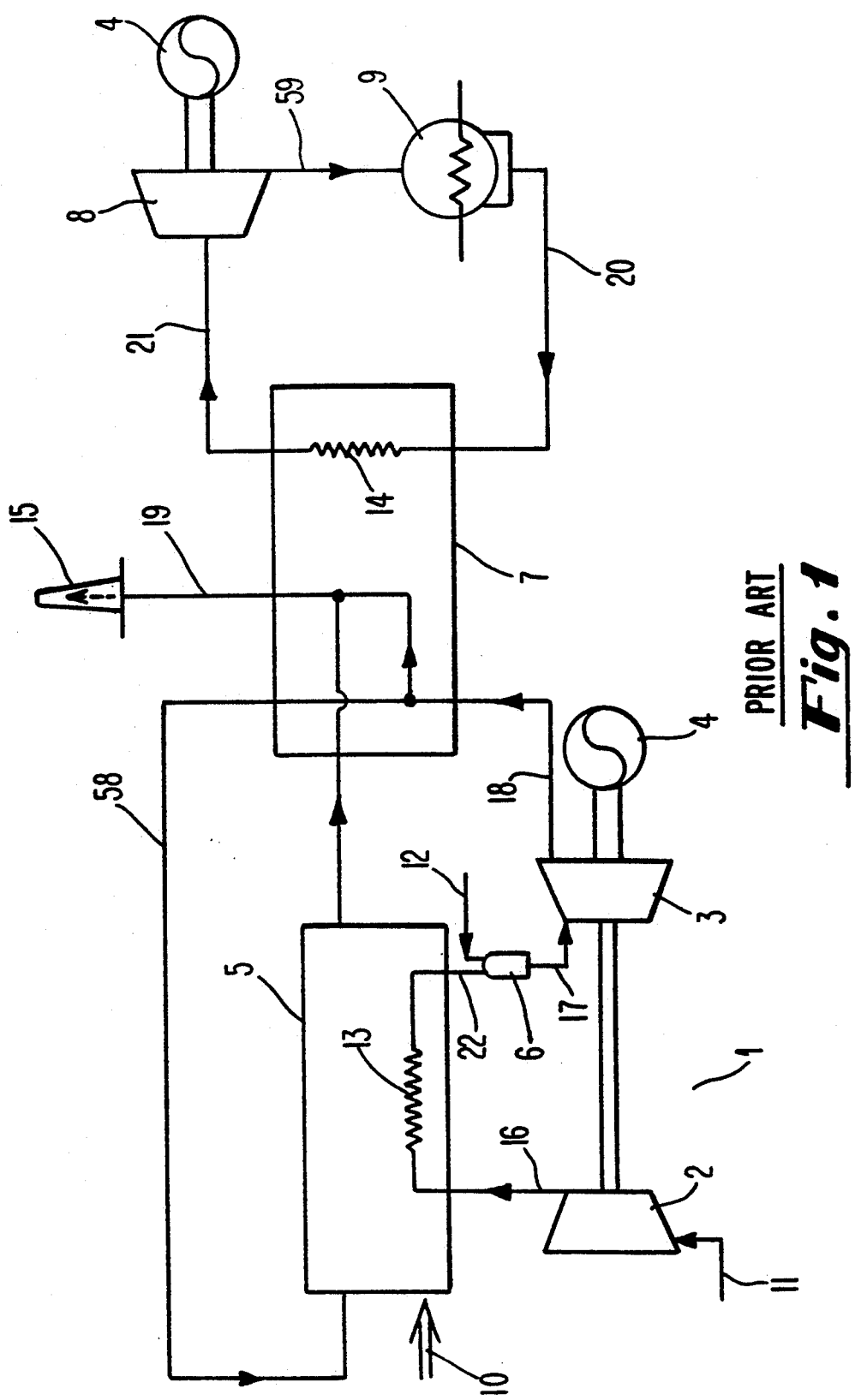
FIG. 1 is a schematic diagram of an indirect fired gas turbine combined cycle power plant employing a topping combustor according to the prior art.

There is shown in FIG. 1 an indirect fired gas turbine combined cycle power plant according to the prior art. Ambient air enters the compressor section 2 of a gas turbine 1. The compressed air 16 produced by the compressor section 2 enters an indirect heat exchanger 13 disposed in a furnace 5 burning a solid fuel 10, such as coal. The furnace 5 may be of the atmospheric fluidized bed type. As previously discussed, as a practical matter, the indirect heat exchanger 13 is only capable of heating the air to about 980° C. (1800° F.). Therefore, the hot compressed air 22 from the heat exchanger 13 is directed to a topping combustor 6 supplied with a conventional fuel 12, such as natural gas or no. 2 distillate oil. The topping combustor 6 raises the temperature of the compressed air to a level consistent with high efficiency in the turbine section 3, typically approximately 1290° C. (2350° F.). The hot gas 17 produced by the topping combustor 6 is then directed to the turbine section 3 of the gas turbine 1, where it is expanded, thereby producing power to drive an electric generator 4.

The gas 18 exhausting from the turbine section 3 is directed to a heat recovery steam generator 7 (HRSG) where much of the latent heat remaining in the exhaust gas 18 is used to convert feedwater 20 to steam 21 via a heat exchanger 14. The steam 21 produced by the HRSG 7 is directed to a steam turbine 8 which expands the steam, thereby producing power to drive a second electric generator 4. The expanded steam 59 is then exhausted to a condenser 9. The gas 58 exhausting from the HRSG 7 is directed to the furnace 5 where it provides oxygen for combustion of the solid fuel 10. The gas 19 exhausting from the furnace 5 is discharged to atmosphere via a stack 15. As shown in FIG. 1, a portion of the gas flowing through the HRSG 7 may be exhausted directly to the stack 15, thereby bypassing the furnace.

Figure 2:
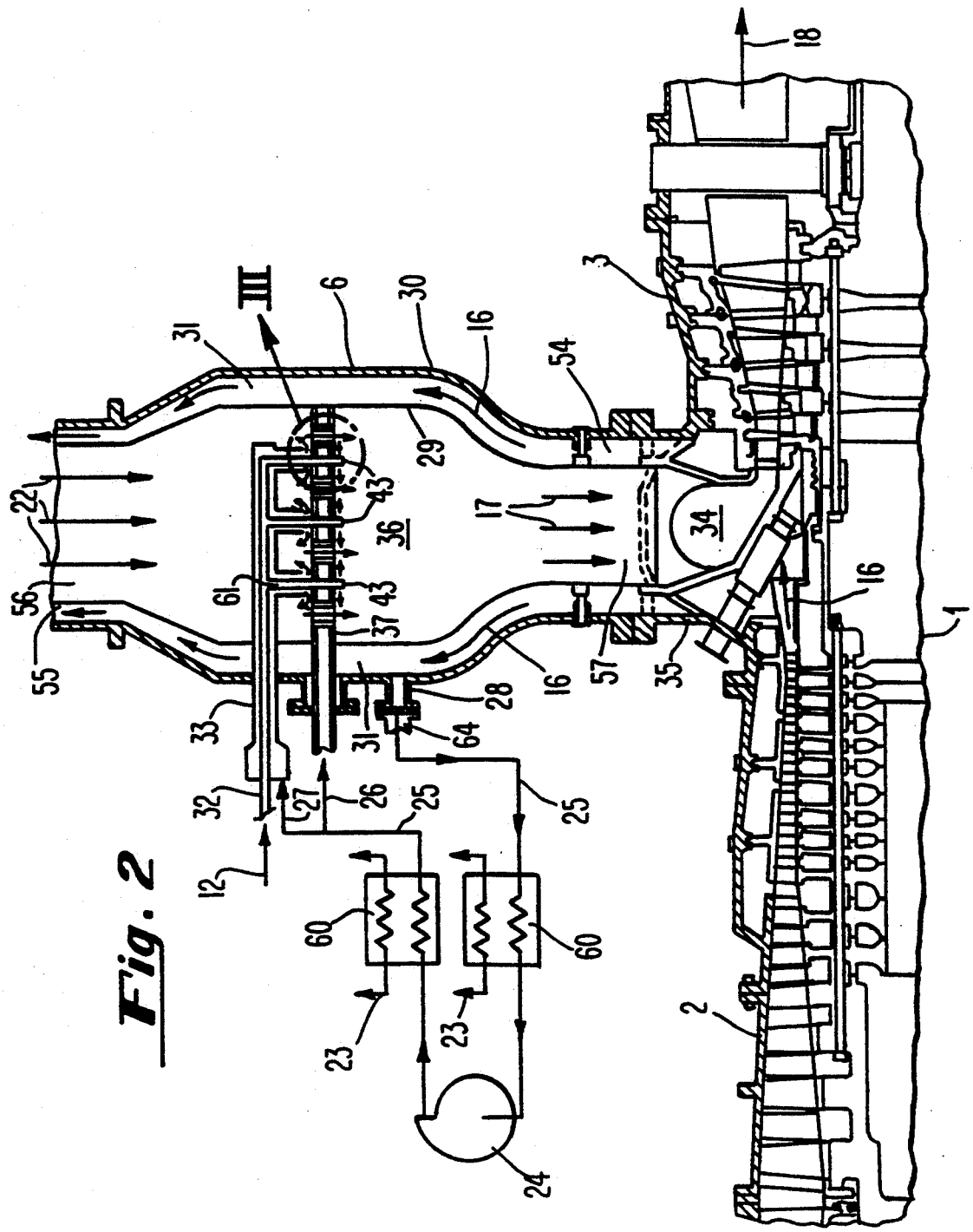
FIG. 2 is a longitudinal cross-section through the upper half of the a gas turbine showing the topping combustor according to the current invention integrated into a conventional gas turbine.

FIG. 2 shows the integration of the topping combustor 6 of the current invention into the gas turbine 1. According to the current invention, an extraction pipe 35 formed in the outer shell of the gas turbine 1 directs the air 16 discharging from the compressor to the topping combustor 6 Although only one topping combustor 6 is shown in FIG. 2, it should be understood that a plurality of extraction pipes 35 could be located around the outer shell, each directing compressed air to one of several topping combustors 6.

As shown in FIG. 2, the topping combustor 6 is comprised of inner and outer cylindrical shells 29 and 30 and a burner assembly. The burner assembly is comprised of a plurality of fuel modules 43 mounted in a fuel distributor plate assembly 37 extending transversely into the inner shell. The inner shell 29 serves as a conduit to direct the flow of the hot compressed air 22 from the furnace 5 to the burner assembly, as discussed further below. The inner shell 29 also serves as a conduit to direct the flow of hot gas 17 from the burner assembly to a toroidal conduit 34 which distributes the hot gas around the inlet of the turbine section 3. Accordingly, the inner shell 29 has necked down portions 56 and 57 at its upper and lower ends which form a combustion air inlet and a hot gas outlet, respectively. The inner shell 29 also serves to enclose the reaction zone 36 downstream of the burner assembly in which combustion occurs.

According to an important aspect of the current invention, the outer shell 30 encloses the inner shell 29, thereby forming an annular passage 31 between the two shells. Extraction pipe 35 directs the compressed air 16 discharging from the compressor section 2 to the inlet 54 of the annular passage 31. The compressed air 16 flows though the annular passage 31 and thence onto the heat exchanger 13. As a result, although the hot compressed air 22 from the furnace 5 forms the combustion air for the topping combustor 6, the relatively cool (i.e., typically less than 370° C. (700° F.)) compressed air 16 from the compressor serves to cool the inner shell 29 of the topping combustor. Moreover, as shown in FIG. 2, the flow of relatively cool air 16 is countercurrent with respect to the flow of the hot air 22 and combustion gas 17, so that the coolest air flows over the hottest portions of the inner shell 29.

Although FIG. 2 shows the compressed air 16 as only flowing over the outer surface of the inner shell 29, in some cases, it may be desirable to transport a portion of the air through the inner shell to provide it with film or transpiration cooling.

As shown in FIG. 2, a portion 25 of the compressed air 16 is withdrawn from the annular passage 31 and directed by pipe 64 to a boost compressor 24 and air-to-air coolers 60. The air-to-air coolers are disposed upstream and downstream of the boost compressor 24 and transfer heat from the compressed air 25 to ambient air 23. As a result, in the preferred embodiment, the compressed air 25 is cooled to approximately 150° C. (300° F.) and its pressure is increased by approximately 138 kPa (20 psi). The cooled further compressed air 25 is then split into two portions 26 and 27. Portion 26 is directed to the fuel distributor plate assembly 37 and portion 27 is directed to a fuel supply pipe jacket 33.

Figure 3:
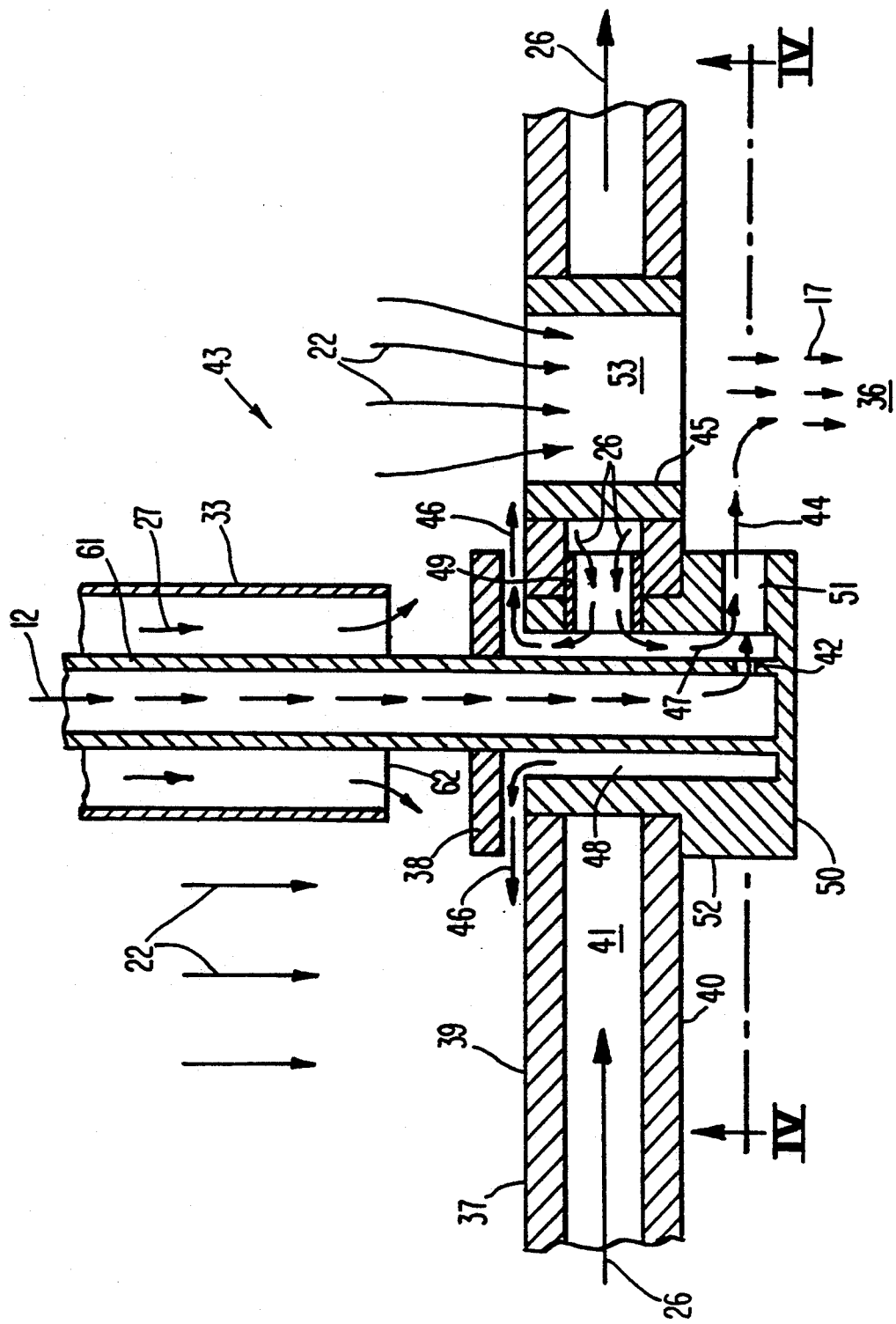
FIG. 3 is a detailed view of the portion of the topping combustor shown in FIG. 2 enclosed by the circle designated III.

As shown in FIG. 2, a plurality of fuel injection modules 43 are formed in the plate assembly 37. As shown in FIG. 3, the plate assembly 37 is comprised of upper and lower substantially planar circular plates 39 and 40, respectively. The diameter of the plates 39 and 40 is only slightly less than the inner diameter of the inner shell 29. Thus, substantially all of the hot air 22 entering the combustor 6 flows through the plate assembly 37. Moreover, the plates 39 and 40 are parallel to each other and spaced apart to form a cooling air passage 41 between them which extends transversely through the inner shell 29. Portion 26 of the further compressed cooled air flows through the cooling air passage 41, thereby cooling the plate assembly 37.

Figure 4:
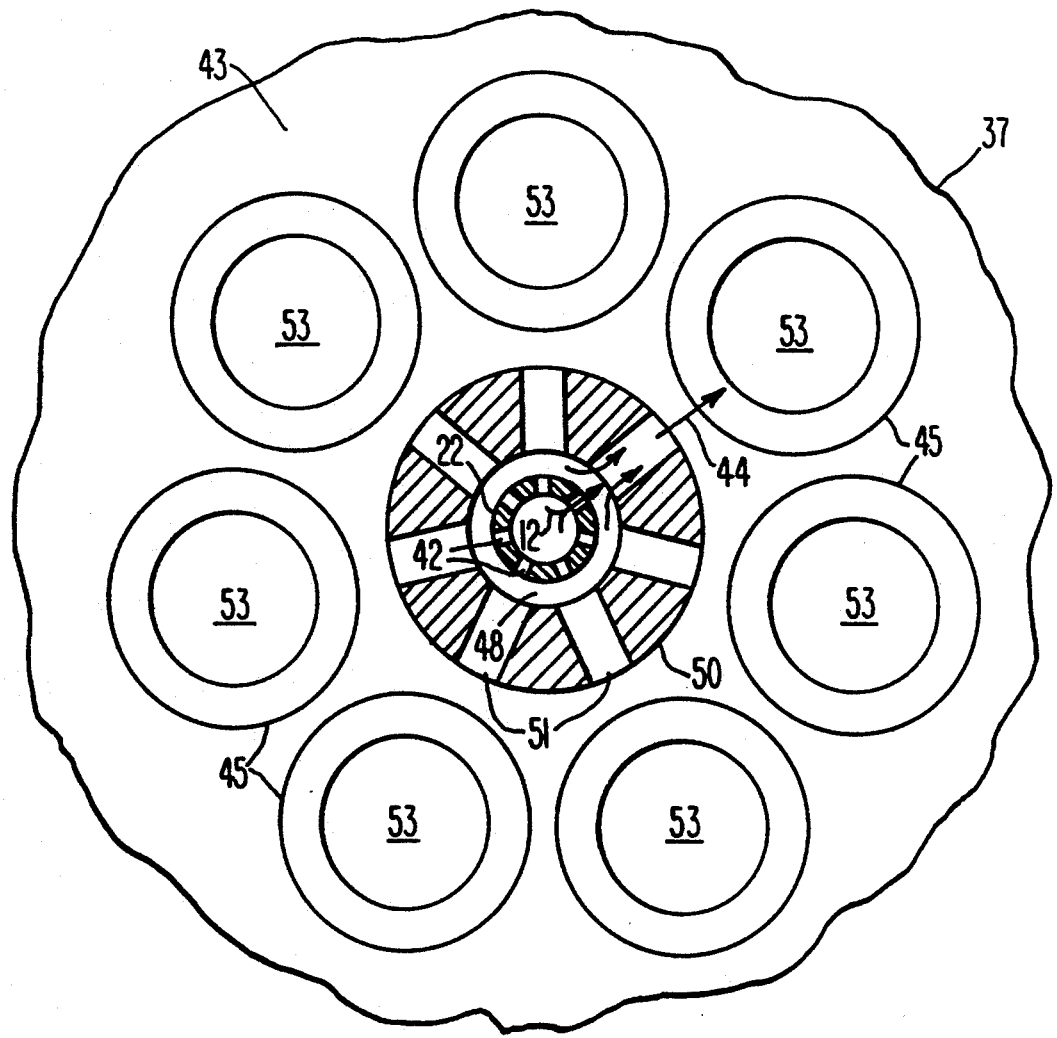
FIG. 4 is a cross-section through line IV—IV shown in FIG. 3.
Figure 5:
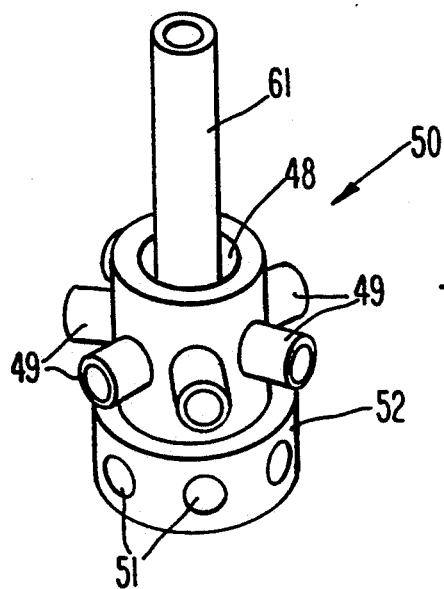
FIG. 5 is an isometric view of the fuel nozzle shown in FIG. 3.

As shown in FIGS. 3 and 4, each fuel module 43 is comprised of a fuel nozzle 50 and seven combustion air passages 53. As shown in FIGS. 3, 4 and 5, each fuel nozzle 50 is comprised of a fuel supply pipe stub 61, which receives fuel 12 from the fuel supply pipe 32, and a nozzle body 52. The nozzle body 52 surrounds the distal end of the pipe stub 61 and forms an annular passage 48 therebetween. As shown in FIG. 3, in the preferred embodiment, seven radially oriented air inlet ports 49 are formed in each fuel nozzle body 52. The air inlet ports 49 serve to direct the cooled air 26 flowing through the plate assembly 37 into the annular passage 48 in each fuel nozzle 50. The cooling air 26 entering the annular passage 48 is divided into two portions 46 and 47. Portion 46 is used to cool the plate 39, as explained further below, while portion 47 is mixed directly with the fuel 12.

As shown in FIGS. 3 and 4, seven radially oriented orifices 42 are formed in the distal end of each pipe stub 61. The orifices 42 serve to mix the fuel 12 flowing into the pipe stub 61 into the portion 47 of the cooled air which entered the annular passage 48. As a result, a rich fuel/air mixture 44 is formed which exits the annular passage 48 through seven radially oriented discharge ports 51 distributed around the fuel nozzle body 52 and aligned with the orifices 42.

As shown best in FIG. 3, the combustion air passages 53 are formed in the plate assembly 37 by sleeves 45 mounted therein. As shown in FIG. 4, the seven air passages 53 are uniformly spaced around a circle concentric with the fuel nozzle 50. Moreover, the air passages 53 are radially aligned with the discharge ports 51 in the fuel nozzle body 52. The air passages 53 serve to distribute the combustion air 22 around each of the fuel nozzles 50 and to form axial jets of hot air 22 which interact with the radial jets of fuel/air mixture 44 formed by the discharge ports 51. As a result, there is vigorous mixing of the combustion air 22 with the rich fuel/air mixture 44 in the reaction zone 36 downstream of the plate assembly 37. This mixing results in an ultra-lean fuel/air ratio in the reaction zone 36.

As is well known in the art, ultra-lean combustion minimizes the formation of $NO_x$. In the current invention, combustion occurs at an overall equivalence ratio of approximately 0.15. (The equivalence ratio is a relative value used to characterize the rich/lean nature of a combustion process. Stoichiometric combustion is defined as an equivalence ratio of 1.0, while conventional gas turbine combustors typically operate at an overall equivalence ratio of approximately 0.37.) Such ultra-lean overall combustion is achieved by the dispersal of a large number of fuel modules 43 around the plate assembly 37 with the local fuel air ratio in the vicinity of each fuel module just high enough to sustain combustion.

According to the current invention, flame stability at such lean fuel/air ratios is made possible by two factors. The first and most important factor is the high temperature of the combustion air 22 flowing through the plate assembly 37. In the preferred embodiment, the heat exchanger 13 is designed to heat the combustion air 22 to approximately 980° C. (1800° F.).

The second factor allowing good flame stability is the low velocity of the combustion gas 17 in the reaction zone 36 downstream of the plate assembly 37. The diameter of the inner shell 29 is sized so that its flow area—that is, its area in a plane perpendicular to the direction of the flow through the inner shell—in the reaction zone 36 results in the average reference velocity (the average reference velocity is defined as the velocity through the combustor calculated based on continuity considerations, using the temperature, pressure, and density of the fuel/air mixture at burner inlet conditions) of the gas 17 flowing therein being relatively high (i.e., approximately 30 m/s (100 fps)). However, the plate assembly 37 blocks a substantial portion of this flow area by confining the flow of the combustion air 22 in the vicinity of the plate assembly to the air passages 53. In the preferred embodiment, the size and quantity of the air passages 53 are such that the portion of flow area blocked by the plate assembly 37 is in the range of approximately 65 to 70%. This flow blockage results in a non-uniform velocity distribution in the reaction zone 36 and the formation of eddy currents downstream of the plate assembly 37. These eddy currents form low velocity zones (i.e., approximately 3 m/s (10 fps))—sometimes collectively referred to as a "sheltered zone"—which prevent the flame in the reaction zone 36 from being blown out.

As shown in FIG. 3, the portion 46 of the cooled air 26 which enters the fuel nozzle through the air inlet port 49, but which does not mix with the fuel 12, flows out of the top of the annular passage 48 and is directed by a baffle 38, attached to the fuel pipe stub 61, to flow over the surface of the upper plate 39 of the plate assembly, thereby providing film cooling for the plate assembly.

As shown in FIG. 2, a second portion 27 of the cooled further compressed air 25 is directed to an annular passage formed by a jacket 33 which encloses the portion of the fuel supply pipe 32 which extends through the inner shell 29, thereby cooling the pipe. As shown in FIG. 3, the fuel pipe jacket 33 forms an outlet 62 just upstream of the plate assembly 37 at each fuel module 43 location. After cooling the fuel pipe 32, the portion 27 of the cooling air discharges from the outlet 62 and flows over the upper plate 39 of the plate assembly 37, thereby providing additional cooling.

I claim:

1. A gas turbine power plant, comprising:
   a) a gas turbine having a compressor section for producing compressed air and a turbine section for receiving a hot gas; and
   b) a combustor adapted to heat at least a portion of said compressed air by burning a first fuel therein, thereby producing said hot gas received by said turbine section, said combustor having:
      (i) a first conduit for directing the flow of compressed air;
      (ii) a second conduit enclosing said first conduit and forming an annular passage therebetween, said annular passage in flow communication with said compressor section;
      (iii) first and second plate forming a cooling air passage therebetween, said annular passage placing said cooling air passage in flow communication with said compressor section, a plurality of fuel nozzles mounted on said first and second plates so as to place said fuel nozzles in flow communication with said cooling air passage, said plates extending into said first conduit transversely to the direction of said flow of compressed air through said first conduit;
      (iv) means for further pressurizing a first portion of said compressed air produced by said compressor section; and
      (v) means for directing said first portion of said compressed air from said annular passage to said further pressurizing means; and
   c) a furnace adapted to heat only a second portion of said compressed air from said compressor section by burning a second fuel, said second fuel being a solid fuel, thereby producing hot compressed air, said furnace in flow communication with said first conduit, whereby said hot compressed air flows through said first conduit, and wherein said annular passage is in flow communication with said furnace, whereby compressed air produced by said compressor section flows through said annular passage to said furnace in a direction counter-current to the direction of flow of said hot compressed air through said first conduit.

2. The gas turbine power plant according to claim 1, further comprising means for cooling said second portion said compressed air.

3. A gas turbine power plant comprising:
   a) a gas turbine having a compressor section for producing compressed air and a turbine section for receiving a hot gas;
   b) a furnace adapted to heat a first portion of said compressed air from said compressor section by burning a first solid fuel, thereby producing hot compressed air; and
   c) a combustor adapted to heat said hot compressed air produced by said furnace by burning a second fuel therein, thereby producing said hot gas received by said turbine section, said combustor having:
      (i) a first conduit for containing a reaction zone for burning said second fuel and for directing the flow of said hot air produced by said furnace to said reaction zone, said first conduit having a hot air flow area in a plane upstream of said reaction zone which is perpendicular to the direction of said flow of hot air through said first conduit;

(ii) means for blocking a first portion of said flow area in said plane, said blocking means not blocking a second portion of said hot air flow area, whereby the velocity of said flow in said reaction zone is non-uniform, said blocking means having a cooling air passage formed therein;

(iii) means for directing cooling air to said cooling air passage, said cooling air directing means having means for directing a second portion of said compressed air produced by said compressor section to said cooling air passage;

(iv) a fuel nozzle for introducing a fuel/air mixture into said reaction zone, said fuel nozzle having means for receiving said cooling air from said cooling air passage; and (v) means for further compressing said second portion of said compressed air directed to said cooling air passage.

4. A gas turbine power plant comprising:

a) a gas turbine having a compressor section for producing compressed air and a turbine section for receiving a hot gas;

b) a furnace adapted to heat a first portion of said compressed air from said compressor section by burning a first fuel, said first fuel being a solid fuel, thereby producing hot compressed air; and c) a combustor adapted to heat said hot compressed air produced by said furnace by burning a second fuel therein, thereby producing said hot gas received by said turbine section, said combustor having:

(i) a first conduit for containing a reaction zone for burning said second fuel and for directing the flow of said hot air produced by said furnace to said reaction zone, said first conduit having a hot air flow area in a plane upstream of said reaction zone which is perpendicular to the direction of said flow of hot air through said first conduit;

(ii) first and second plates disposed approximately parallel to each other and perpendicular to said direction of flow of hot air through said first conduit, said first and second plates blocking a first portion of said hot air flow area in said plane, said plates not blocking a second portion of said hot air flow area, whereby the velocity of said flow in said reaction zone is non-uniform, said first and second plates forming a cooling air passage therebetween and having a plurality of holes formed therein for allowing said hot air produced by said furnace to flow through said first and second plates in predetermined locations, said first plate having a surface exposed to said hot air flow;

(iii) means, in flow communication with said annular passage, for directing a first portion of said cooling air to flow over said first plate surface;

(iv) means for directing cooling air to said cooling air passage; and (v) a fuel nozzle for introducing a fuel/air mixture into said reaction zone mounted in said first and second plates, said holes arranged around said fuel nozzle, said fuel nozzle having means for receiving said cooling air from said cooling air passage and having a body portion and means for receiving said fuel, said body portion and said fuel receiving means forming an annular passage therebetween, said annular passage in flow communication with said fuel nozzle cooling air receiving means, whereby said cooling air flows through said annular passage, said fuel nozzle having an orifice, in flow communication with said annular passage, for directing said second fuel into a second portion of said cooling air, thereby forming a fuel/air mixture, said fuel nozzle having means for directing said fuel/air mixture into said hot air flowing through said holes in said first and second plates, said fuel/air mixture directing means oriented so as to direct said fuel/air mixture in a direction approximately perpendicular to the direction of said hot air flow through said holes.

5. A gas turbine power plant comprising:

a) a gas turbine having a compressor section for producing compressed air and a turbine section for receiving a hot gas;

b) a furnace adapted to heat a first portion of said compressed air from said compressor section by burning a first fuel, said first field being a solid fuel, thereby producing hot compressed air; and c) a combustor for burning a second fuel having:

(i) inner and outer conduits, said inner conduit containing a reaction zone for burning said second fuel and in flow communication with said furnace, said inner and outer conduits forming an annular passage therebetween, said annular passage in flow communication with said compressor section and with said furnace, whereby said first portion of said compressed air flows through said annular passage; and (ii) a burner disposed in said inner conduit and having first and second plates enclosing a cooling air passage therebetween and a plurality of fuel nozzles mounted thereon, said cooling air passage in flow communication with said compressor section, whereby a second portion of said compressed air produced by said compressor section flows through said cooling air passage and into said fuel nozzles, said fuel nozzles having means for mixing at least a portion of said second portion of said compressed air with said second fuel; and d) means for further compressing said second portion of said compressed air.

* * * * *